UNITED STATES PATENT OFFICE.

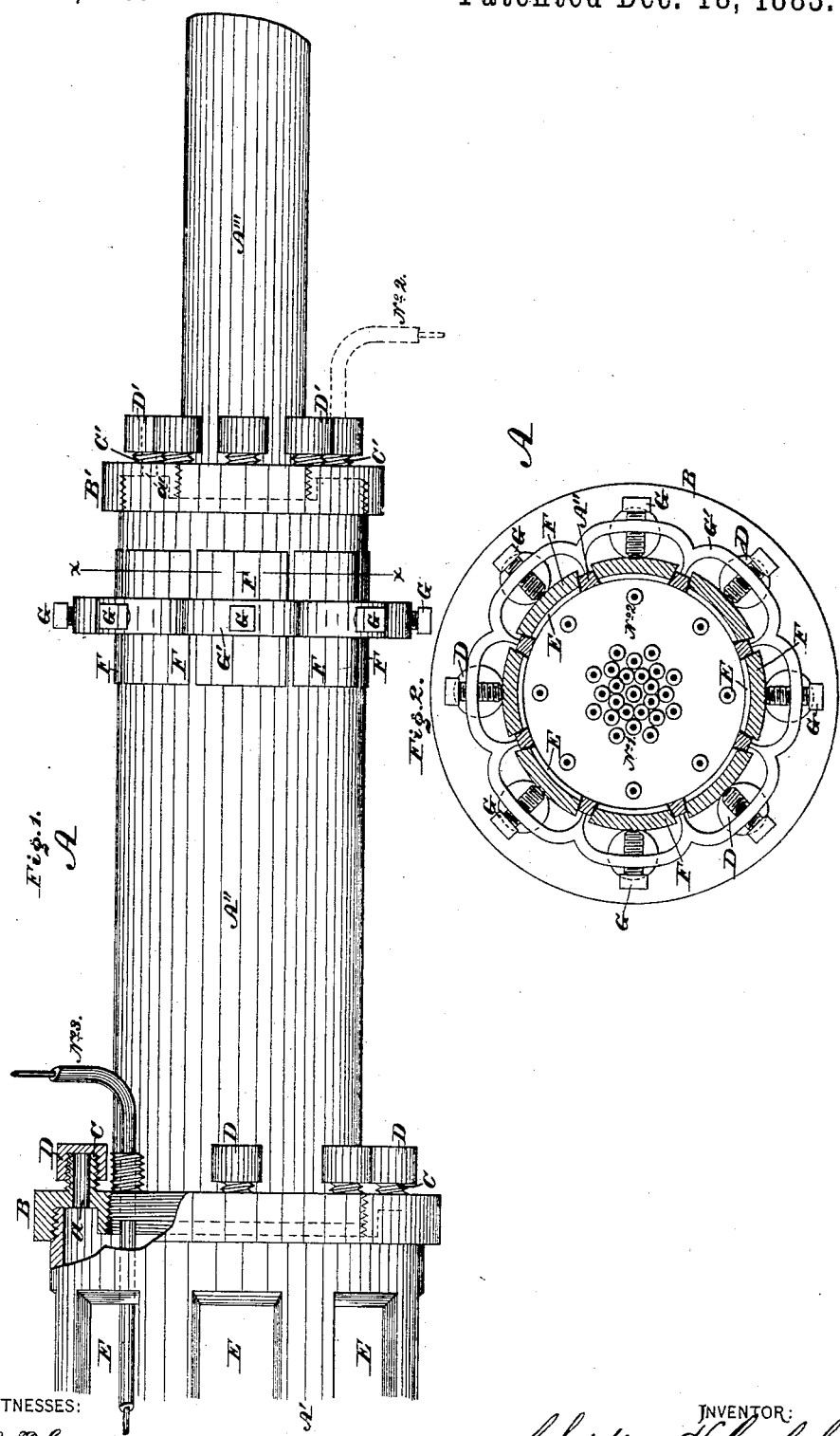

CHRISTIAN H. GOEBEL, OF PHILADELPHIA, PA., ASSIGNOR TO THE AMERICAN SECTIONAL ELECTRIC UNDERGROUND COMPANY, OF NEW JERSEY.

UNDERGROUND CONDUIT FOR ELECTRIC WIRES.

SPECIFICATION forming part of Letters Patent No. 290,416, dated December 18, 1883.

Application filed July 8, 1882. (No model.)

*To all whom it may concern:*

Be it known that I, CHRISTIAN H. GOEBEL, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 is a side elevation, partly broken away, of the conduit embodying my invention. Fig. 2 is a transverse section thereof in line $x$ $x$, Fig. 1.

Similar letters of reference indicate corresponding parts in the two figures.

My invention consists of the construction of an underground conduit for electric wires wherein the wires are readily accessible for branches, turn-outs, &c., at different lengths of the route without disturbing the wires of the main line or those running to remote points, as will be hereinafter fully set forth.

Referring to the drawings, A represents a conduit formed of tubes A' A'' A''', of successively-reduced diameters. The tube A' is connected with the tube A'' by means of a cap, B, which is of the form of an annulus, which is screwed or otherwise secured on its outer circumference to the end of the tube A', and has the end of the tube A'' screwed or otherwise secured to its inner circumference. The outer face of the cap B has a circular row of openings, $a$, and to it are secured, at coincident places, nipples C, which are covered by caps or plugs D. The tube A'' is connected with the tube A''' by means of a cap, B', which is of the form of an annulus, which is secured on its outer circumference to the end of the tube A'', and has the end of the tube A''' secured to its inner circumference. The outer face of the cap B' has a circular row of openings, $a'$, and to it are secured, at coincident places, nipples C', which are covered by caps or plugs D'. The tube A''' may be connected with another tube of reduced diameter, and additional connections made, the length of the conduit being thereby extended as desired. In the wall of each tube are openings E, which communicate with the interior of the respective tubes, and covering said openings are plates F, which are held in place by screws G, which are fitted to an annulus or yoke, G', which circumscribes the plates.

The operation is as follows: Wires No. 1, to be run the main or entire length of the route, are passed through the center of the conduit, and thus through the center of the lengths of the tubes A' A'' A'''. Wires No. 2, for intermediate points or stations, are run through the tubes A' and A'' around the main length of wires. In order to make connections with the wires No. 2, the caps or plugs D' are unscrewed, and the plates F of the tube A'' are removed by loosening the screws G. Wires are now introduced through the nipples C' into the tube A'', and attached to the wires No. 2, the openings E of the tube A'' readily admitting the hand and tools, whereby such attachment or connection is accomplished. The plates F are reapplied and the screws G tightened, whereby the tube A'' is again securely closed, and the branch wires passing therefrom may be inclosed in tubes or other protectors screwed to the nipples C'. Wires No. 3, for other points, are run through the tube A' around the lengths of wires Nos. 1 and 2, and their ends in the tube A' are accessible by removing the plates F of said tube, for which purpose the screws G are loosened. The plugs or caps of the nipples C are also removed, and the branch wires are passed through said nipples C and connected with the wires No. 3, as described for the wires No. 2, the plates F being reapplied and secured, thus closing the tube A' similarly to the tube A''.

It will be seen that the different series or groups of wires are separated, and do not interfere with each other, and access is had to either series or group in a convenient and practicable manner, as the openings E and plates F provide means for tapping the tubes and reaching the wires, whether of the main line or branches and turn-outs, as well as affording entrance to the tubes for the purpose of repairing, testing, and examining the wires, and generally inspecting the condition of the conduit.

It is evident that when additional tubes are connected with the tubes A' A'' A''' they are furnished with the opening-plates, annuli, &c., so that there is increased provision for the distribution of wires for branches and turn-offs.

Having thus described my invention, what I claim as new, and desire to secure by Letters Patent, is—

1. Two tubes or sections of a tubular conduit, one being of less diameter than the other, in combination with devices for connecting them, and a nipple or nipples in the end of the larger tube for the passage of branch wires, said larger tube being provided with an opening for the insertion of the operator's hand in arranging said branch wires, substantially as set forth.

2. A wire-receiving tube having an opening in its side for the insertion of a hand, and a nipple in its end for the passage of a branch wire, in combination with a removable covering-plate for said opening and a clamping-yoke for securing said plate over said opening.

3. The series of tubes of successively-lessening diameter, having openings in their sides and caps on their ends, in combination with covering-plates for said openings, encircling-yokes, and securing-screws, said caps having openings for branch wires, substantially as set forth.

CHRISTIAN H. GOEBEL.

Witnesses:
JOHN A. WIEDERSHEIM,
A. P. GRANT.